US011999813B2

(12) United States Patent
Wang et al.

(10) Patent No.: US 11,999,813 B2
(45) Date of Patent: *Jun. 4, 2024

(54) PROPYLENE BUTENE COPOLYMER

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Matthias Hoff, Linz (AT)

(73) Assignee: BOREALIS AG, Vienna (AT)

( * ) Notice: Subject to any disclaimer, the term of this patent is extended or adjusted under 35 U.S.C. 154(b) by 243 days.

This patent is subject to a terminal disclaimer.

(21) Appl. No.: 17/292,066

(22) PCT Filed: Nov. 14, 2019

(86) PCT No.: PCT/EP2019/081323
§ 371 (c)(1),
(2) Date: May 7, 2021

(87) PCT Pub. No.: WO2020/099563
PCT Pub. Date: May 22, 2020

(65) Prior Publication Data
US 2021/0395427 A1 Dec. 23, 2021

(30) Foreign Application Priority Data

Nov. 15, 2018 (EP) .................................. 18206509

(51) Int. Cl.
*C08F 210/08* (2006.01)
*C08F 210/06* (2006.01)
*C08F 297/08* (2006.01)
*C08J 5/18* (2006.01)
*C08L 23/14* (2006.01)
*C08L 23/20* (2006.01)

(52) U.S. Cl.
CPC ............. *C08F 297/083* (2013.01); *C08J 5/18* (2013.01); *C08F 210/06* (2013.01); *C08F 210/08* (2013.01); *C08F 2420/00* (2013.01); *C08J 2353/00* (2013.01); *C08L 23/14* (2013.01); *C08L 23/20* (2013.01); *C08L 2205/025* (2013.01)

(58) Field of Classification Search
None
See application file for complete search history.

(56) References Cited

U.S. PATENT DOCUMENTS

| 3,242,150 | A | 3/1966 | Scoggin |
| 3,324,093 | A | 6/1967 | Alleman |
| 3,374,211 | A | 3/1968 | Marwil et al. |
| 3,405,109 | A | 10/1968 | Rohlfing |
| 4,582,816 | A | 4/1986 | Miro |
| 5,391,654 | A | 2/1995 | Ahvenainen et al. |
| 5,677,408 | A | 10/1997 | Ueda et al. |
| 6,388,040 | B1 * | 5/2002 | Fujita ................ C08F 210/16 526/348 |

FOREIGN PATENT DOCUMENTS

| EP | 0479186 | A2 | 4/1992 |
| EP | 0517868 | B1 | 11/1995 |
| EP | 0887379 | | 12/1998 |
| EP | 0891990 | A2 | 1/1999 |
| EP | 1310295 | | 5/2003 |
| EP | 1415999 | | 5/2004 |
| EP | 1153080 | | 7/2004 |
| EP | 1442078 | | 4/2005 |
| EP | 1591460 | | 11/2005 |
| EP | 2173806 | | 10/2012 |
| EP | 2376568 | | 5/2013 |
| EP | 2751314 | | 7/2014 |
| EP | 2586801 | | 12/2014 |
| EP | 2965908 | | 1/2016 |
| EP | 3126411 | | 11/2017 |
| EP | 3257878 | | 12/2017 |
| WO | 96/19503 | | 6/1996 |
| WO | 96/32420 | | 10/1996 |
| WO | 03/002625 | A1 | 1/2002 |
| WO | 03/051934 | | 6/2003 |
| WO | 2006/069733 | | 7/2006 |
| WO | 2007/025640 | | 3/2007 |
| WO | 2010/052260 | | 5/2010 |
| WO | 2010/052263 | | 5/2010 |
| WO | 2010/052264 | | 5/2010 |
| WO | 2011080152 | A1 | 7/2011 |
| WO | 2013/007650 | | 1/2013 |
| WO | 2018/108936 | | 6/2018 |
| WO | 2018/122033 | | 7/2018 |
| WO | 2018/122263 | | 7/2018 |
| WO | WO-2018122263 | A1 * | 7/2018 ............. B32B 27/06 |
| WO | 2018/207951 | | 11/2018 |

OTHER PUBLICATIONS

International Search Report and Written Opinion issued for Application No. PCT/EP2019/081323, dated Feb. 25, 2020.
Klimke, Katja, et al. "Optimisation and Application of Polyolefin Branch Quantification by Melt-State 13C NMR Spectroscopy." Macromolecular Chemistry and Physics 207.4 (2006): 382-395.
Parkinson, Matthew, et al. "Effect of Branch Length on 13C NMR Relaxation Properties in Molten Poly [ethylene-co-(α-olefin)] Model Systems." Macromolecular Chemistry and Physics 208.19-20 (2007): 2128-2133.

(Continued)

*Primary Examiner* — Richard A Huhn
(74) *Attorney, Agent, or Firm* — Meunier Carlin & Curfman LLC

(57) ABSTRACT

The invention provides a multimodal propylene butene random copolymer having a melt flow rate (MFR$_2$) of 1.0 to 20.0 g/10 min and a butene content of 5.0 to 20.0 wt %, wherein said copolymer is prepared using a single site catalyst and wherein said copolymer comprises: (i) 30 to 70 wt % of a propylene butene copolymer (A) having an MFR$_2$ of 0.5 to 20.0 g/10 min and a butene content of 2.0 to 10.0 wt %; and (ii) 70 to 30 wt % of a propylene butene copolymer (B) having an MFR$_2$ of 0.5 to 20.0 g/10 min and a butene content of 4.0 to 20.0 wt %; wherein copolymers (A) and (B) are different.

12 Claims, No Drawings

(56) References Cited

OTHER PUBLICATIONS

Castignolles, Patrice, et al. "Detection and quantification of branching in polyacrylates by size-exclusion chromatography (SEC) and melt-state 13C NMR spectroscopy." Polymer 50.11 (2009): 2373-2383.
Pollard, M., et al. "Observation of chain branching in polyethylene in the solid state and melt via 13C NMR spectroscopy and melt NMR relaxation time measurements." Macromolecules 37.3 (2004): 813-825.
Filip, Xenia, Carmen Tripon, and Claudiu Filip. "Heteronuclear decoupling under fast MAS by a rotor-synchronized Hahn-echo pulse train." Journal of Magnetic Resonance 176.2 (2005): 239-243.
Griffin, John M., et al. "Low-load rotor-synchronised Hahn-echo pulse train (RS-HEPT) 1H decoupling in solid-state NMR: factors affecting MAS spin-echo dephasing times." Magnetic Resonance in Chemistry 45.S1 (2007): S198-S208.
Randall, James C. "JMS-Rev." Macromol. Chem. Phys. C 29 (1989): 201-317.

* cited by examiner

PROPYLENE BUTENE COPOLYMER

CROSS-REFERENCE TO RELATED APPLICATIONS

This application is a United States National Phase Patent Application of International Patent Application Number PCT/EP2019/081323, filed on Nov. 14, 2019, which claims the benefit of priority to EP Application No. 18206509.4, filed Nov. 15, 2018, the contents of which are incorporated by reference herein in their entirety.

FIELD OF THE INVENTION

This invention relates to a propylene butene random copolymer, in particular to a multimodal propylene butene random copolymer prepared using a single site catalyst. The invention further relates to a process for preparing said random copolymer and to articles, such as films, comprising said random copolymer.

BACKGROUND

Packaging films based on polyolefins are well known in the literature, as these can generally be easily processed, are light in weight, stable to environmental conditions and are capable of being tailored to particular applications to meet the varying demands of the packaging field. Food packaging in particular places several high demands on the material used. First, the packaging must be sufficiently tight in order to sufficiently protect the packaged or sealed-material, and to make the handling of the sealed products, in particular during transport, sufficiently safe. Thus, good sealing behaviour is desired. Ideally, the films are heat-sealable at as a low temperature as possible to minimise energy input during the sealing process.

Another important consideration is mechanical properties. Polymers with higher stiffness may allow for the use of lower film thicknesses, leading to both material and energy savings. Good impact behaviour is also essential so the contents of the packaging remain safely contained, even if dropped.

Sterilisation behaviour must also be considered since materials used in food packaging application are now typically subjected to sterilisation before use. The most common sterilisation procedures are the use of heat (steam), radiation (beta radiation, electrons, or gamma radiation) or chemicals (usually ethylene oxide). Steam sterilisation is usually carried out in a temperature range of about 120 to 130° C. Thus, the material should have a sufficient thermal stability, like a melting temperature higher than the usual steam sterilisation temperature of about 120 to 130° C.

Of course, treatment of a polymer under the sterilisation conditions outlined above can impair its final properties, especially the optical properties such as transparency. Thus, ideally, excellent sterilisation behaviour in terms of retention of low haze level after sterilisation is desirable.

Polypropylene random copolymers are widely used in such packaging applications due to their good balance of properties. Typically these are copolymers of propylene and ethylene. In order to fulfil the different requirements of the packaging, however, and provide the necessary balance of properties, these copolymers have normally been applied as multilayer structures. For example, a low Tm (melting temperature) propylene ethylene copolymer layer, which provides the best sealing properties, is combined with a higher Tm propylene ethylene copolymer, which offers good stiffness. These types of structures are described in, for example, EP 2965908. The use of multilayer structures has a number of drawbacks, however. Principally these include complexity in the production of the materials and recycling. There is a drive across all areas of industry, particularly in the field of plastics, to increase recyclability of the materials used. Multilayer structures present a substantial challenge for reuse.

Propylene butene copolymers are also known in film applications (e.g. as described in EP 3257878), however the majority of these grades are made using Ziegler-Natta (ZN) catalysts. Disadvantages associated with the use of ZN catalysts are that they tend to produce a lot of oligomers and high comonomer contents are needed in order to achieve desirable low melting temperatures.

It is thus an object of the present invention to provide a new polymer which can overcome at least some of the problems associated with those currently employed. A polymer which offers an attractive balance of properties for application in the food packaging field is looked-for. In particular, a polymer which can be employed as a single layer material is desirable. Preferably, more than one of these factors is achieved.

SUMMARY

Thus, in a first aspect, the invention provides a multimodal propylene butene random copolymer having a melt flow rate (MFR$_2$) of 1.0 to 20.0 g/10 min and a butene content of 5.0 to 20.0 wt %, wherein said copolymer is prepared using a single site catalyst and wherein said copolymer comprises:
  (i) 30 to 70 wt % of a propylene butene copolymer (A) having an MFR$_2$ of 0.5 to 20.0 g/10 min and a butene content of 2.0 to 10.0 wt %; and
  (ii) 70 to 30 wt % of a propylene butene copolymer (B) having an MFR$_2$ of 0.5 to 20.0 g/10 min and a butene content of 4.0 to 20.0 wt %;
  wherein copolymers (A) and (B) are different.

In a second aspect, the invention provides the process for the preparation of a multimodal propylene butene random copolymer as hereinbefore defined, said process comprising:
  (i) polymerising propylene and butene in a first polymerisation stage in the presence of a single site catalyst to prepare a first propylene butene copolymer having a MFR$_2$ from 0.5 to 20.0 g/10 min and a butene content of 2.0 to 10.0 wt %;
  (ii) polymerising propylene and butene in a second polymerisation stage in the presence of said catalyst and said first propylene butene copolymer to prepare said multimodal propylene butene copolymer.

In a third aspect, the invention provides an article, such as a film, comprising a multimodal propylene butene copolymer as hereinbefore defined.

In a final aspect, the invention provides the use of a multimodal propylene butene random copolymer as defined herein for the manufacture of an article, preferably a film.

DETAILED DESCRIPTION

Definitions

By "random" copolymer is meant a copolymer in which the comonomer units are randomly distributed within the copolymer. Specifically in the context of the present invention, the propylene butene random copolymer is thus a polymer in which the butene comonomer units are randomly distributed within the copolymer.

Multimodal Propylene Butene Random Copolymer

It has been found that the multimodal propylene butene random copolymer according to the invention provides a new material suitable for packaging applications, in particular as a film, which combines very good mechanical properties e.g. in terms of stiffness (measured by tensile modulus), with attractive sealing properties (e.g. in terms of a low sealing temperature). In particular, by tuning the comonomer distribution between the two copolymer fractions of the multimodal copolymer, it is possible to access a broader property range in terms of mechanical, sealing and optical properties than has previously been possible. The copolymer also possesses good sterilisation behaviour which is of particular importance in the food packaging industry. Sterilisation behaviour is typically measured via changes in properties (e.g. mechanics (toughness) or optics) after the sterilisation process In the present invention, a comparison of haze before and after sterilisation is performed, the less the negative change, the better the sterilisation.

The polymer of the invention is a multimodal polypropylene and is a propylene copolymer. By propylene copolymer is meant a polymer the majority by weight of which derives from propylene monomer units (i.e. at least 50 wt % propylene relative to the total weight of the copolymer). The comonomer is butene. The butene content in multimodal copolymer is in the range 5.0 to 20.0 wt % relative to the total weight of the copolymer, preferably 5.5 to 18.0 wt %, more preferably 6.0 to 16.0 wt %, more preferably 6.5 to 14.0 wt %.

Whilst it is within the ambit of the invention for the multimodal propylene butene random copolymer to comprise other copolymerisable monomers, it is preferable that propylene and butene are the only monomers present, i.e. butene is the only comonomer. It is especially preferred if the multimodal propylene butene copolymer is substantially free of ethylene, e.g. comprises less than 0.1 wt % ethylene, preferably less than 0.01 wt % ethylene, more preferably less than 0.001 wt %.

If present, other copolymerisable monomers may be ethylene or C5-12, especially C5-10, alpha olefin comonomers, particularly singly or multiply ethylenically unsaturated comonomers, in particular C5-10-alpha olefins such as hex-1-ene, oct-1-ene, and 4-methyl-pent-1-ene. The use of 1-hexene and 1-octene is particularly preferred.

The polypropylene of the invention is multimodal. Usually, a polypropylene comprising at least two polypropylene fractions, which have been produced under different polymerisation conditions resulting in different (weight average) molecular weights and molecular weight distributions for the fractions or different comonomer distributions, is referred to as "multimodal". Accordingly, in this sense the polymers of the invention are multimodal polypropylene. The prefix "multi" relates to the number of different polymer fractions the polymer is consisting of. Preferably, the polypropylene is bimodal, i.e. consisting of two polypropylene fractions (A) and (B).

The multimodal propylene butene random copolymer of the invention has a melt flow rate ($MFR_2$) of 1.0 to 20.0 g/10 min. Typically, the multimodal propylene butene random copolymer has an $MFR_2$ of 18.0 g/10 min or less, preferably 16.0 g/10 min or less, more preferably 12.0 g/10 min or less, such as 10.0 g/10 min or less. The polymer preferably has a minimum $MFR_2$ of 1.5 g/10 min, such as greater than 2.5 g/10 min, preferably at least 3.5 g/10 min, ideally at least 4.0 g/10 min, especially 5.0 g/10 min or more. Thus, particularly suitable values of $MFR_2$ are from 4.0 to 12.0 g/10 min, such as 5.0 to 10.0 g/10 min.

The density of the polypropylene may typically be in the range 890 to 907 $kg/m^3$, ideally 900 to 905 $kg/m^3$.

Preferably, the multimodal propylene butene copolymer has a flexural modulus of at least 750 MPa, more preferably at least 800 MPa, such as at least 830 MPa. Typically, the copolymer has a flexural modulus of less than 1600 MPa, such as less than 1400 MPa.

The polypropylene polymer preferably has a molecular weight distribution Mw/Mn, being the ratio of the weight average molecular weight Mw and the number average molecular weight Mn, of less than 4.5, such as 2.0 to 4.0, e.g. 3.0.

Generally, the polypropylene polymer has a xylene soluble content (XCS) of less than 10.0 wt %, preferably less than 8.0 wt %, more preferably less than 6.0 wt %, such as less than 5.0 wt %. A typical lower limit for XCS may be 0.1 wt % or 0.5 wt %. The xylene soluble fraction is determined according to ISO 16152 at 25° C.

As noted above, the polymers of the invention preferably comprise at least two polypropylene fractions (A) and (B). In one particularly preferably embodiment, the multimodal polypropylene consists of fractions (A) and (B). The weight ratio of fraction (A) to fraction (B) in the multimodal polypropylene is in the range 30:70 to 70:30, more preferably 35:65 to 65:35, most preferably 40:60 to 60:40. In some embodiments the ratio may be 45 to 55 wt % of fraction (A) and 55 to 45 wt % fraction (B), such as 50 wt % of fraction (A) and 50 wt % fraction (B).

It is a requirement of the invention that polymer fractions (A) and (B) are different.

(i) Propylene Butene Copolymer (A)

Fraction (A) is a propylene butene copolymer component. Typically, fraction (A) consists of a single propylene butene copolymer. By propylene copolymer is meant a polymer the majority by weight of which derives from propylene monomer units (i.e. at least 50 wt % propylene relative to the total weight of the copolymer). The comonomer is butene. The butene content in copolymer (A) is in the range 2.0 to 10.0 wt % relative to the total weight of the copolymer, preferably 3.0 to 9.0 wt %, more preferably 4.0 to 8.0 wt %.

Whilst it is within the ambit of the invention for the propylene butene copolymer (A) to comprise other copolymerisable monomers, it is preferable that propylene and butene are the only monomers present, i.e. butene is the only comonomer. It is especially preferred if copolymer (A) is substantially free of ethylene, e.g. comprises less than 0.1 wt % ethylene, preferably less than 0.01 wt % ethylene, more preferably less than 0.001 wt %.

If present, other copolymerisable monomers may be ethylene or C5-12, especially C5-10, alpha olefin comonomers, particularly singly or multiply ethylenically unsaturated comonomers, in particular C5-10-alpha olefins such as hex-1-ene, oct-1-ene, and 4-methyl-pent-1-ene. The use of 1-hexene and 1-octene is particularly preferred.

The propylene butene copolymer (A) of the invention has a melt flow rate ($MFR_2$) of 0.5 to 20.0 g/10 min. Typically, the propylene butene copolymer (A) has an $MFR_2$ of 15.0 g/10 min or less, preferably 12.0 g/10 min or less, preferably 10.0 g/10 min or less, such as 8.0 g/10 min or less. The polymer preferably has a minimum $MFR_2$ of 1.0 g/10 min, such as greater than 1.5 g/10 min, preferably at least 2.0 g/10 min. Thus, particularly suitable values of $MFR_2$ are from 1.0 to 10.0 g/10 min, such as 2.0 to 8.0 g/10 min.

The propylene butene copolymer fraction (A) is present in an amount of 30 to 70 wt %, preferably 35 to 65 wt %, more preferably 40 to 60 wt %, such as 45 to 55 wt %, e.g. 50 wt %.

(ii) Propylene Butene Copolymer (B)

Fraction (B) is a propylene butene copolymer component. Typically, fraction (B) consists of a single propylene butene copolymer. By propylene copolymer is meant a polymer the majority by weight of which derives from propylene monomer units (i.e. at least 50 wt % propylene relative to the total weight of the copolymer). The comonomer is butene. The butene content in copolymer (B) is in the range 4.0 to 20.0 wt % relative to the total weight of the copolymer, preferably 5.0 to 18.0 wt %, more preferably 6.0 to 16.0 wt %.

Whilst it is within the ambit of the invention for the propylene butene copolymer (B) to comprise other copolymerisable monomers, it is preferable that propylene and butene are the only monomers present, i.e. butene is the only comonomer. It is especially preferred if copolymer (B) is substantially free of ethylene, e.g. comprises less than 0.1 wt % ethylene, preferably less than 0.01 wt % ethylene, more preferably less than 0.001 wt %.

If present, other copolymerisable monomers may be ethylene or C5-12, especially C5-10, alpha olefin comonomers, particularly singly or multiply ethylenically unsaturated comonomers, in particular C5-10-alpha olefins such as hex-1-ene, oct-1-ene, and 4-methyl-pent-1-ene. The use of 1-hexene and 1-octene is particularly preferred.

The propylene butene copolymer (B) of the invention has a melt flow rate (MFR$_2$) of 0.5 to 20.0 g/10 min. Typically, the propylene butene copolymer (B) has an MFR$_2$ of 15.0 g/10 min or less, preferably 12.0 g/10 min or less, preferably 10.0 g/10 min or less, such as 8.0 g/10 min or less. The polymer preferably has a minimum MFR$_2$ of 1.0 g/10 min, such as greater than 1.5 g/10 min, preferably at least 2.0 g/10 min. Thus, particularly suitable values of MFR$_2$ are from 1.0 to 10.0 g/10 min, such as 2.0 to 8.0 g/10 min.

The propylene butene copolymer fraction (B) is present in an amount of 70 to 30 wt %, preferably 65 to 35 wt %, more preferably 60 to 40 wt %, such as 55 to 45 wt %, e.g. 50 wt %.

Preparation of Multimodal Propylene Butene Random Copolymer

The multimodal propylene butene random copolymer of the invention may be prepared by any known process in the art, such as by blending the two fractions (A) and (B). However, preferably, the multimodal copolymer is produced in a multistage process wherein fractions (A) and (B) are produced in subsequent stages. The properties of the fractions produced in a higher stage of the multistage process may be calculated as follows.

The MFR of the second fraction (B), produced in the second reactor is determined according to $$\log(MFR(B)) = \frac{\log(MFR(PP-Copo)) - w(A) * \log(MFR(A))}{w(B)}$$

wherein
MFR (PP-Copo) denominates the MFR propylene butene copolymer
w(A) and w(B) denominate the weight fractions of the first polypropylene fraction and second polypropylene fraction respectively
MFR(A) denominates the MFR of the first polypropylene fraction (A) produced in the first reactor.

Thus, although not directly measurable on the multistage process products, the properties of the fractions produced in higher stages of such a multistage processes may be determined by applying the above method.

Multimodal propylene copolymers produced in a multistage process are also designated as "in-situ" blends. The resulting end product consists of an intimate mixture of the polymers from the two or more reactors. These two polymers may have different molecular-weight-distribution curves, and/or they may differ in terms of comonomer content or type. The end product thus contains a mixture or two or more polymers with differing properties, i.e. it is a multimodal polymer mixture In a particularly, preferred embodiment, the multimodal propylene butene random copolymer is prepared by a process comprising:

(i) polymerising propylene and butene in a first polymerisation stage in the presence of a single site catalyst to prepare a first propylene butene copolymer having a MFR$_2$ from 0.5 to 20.0 g/10 min and a butene content of 2.0 to 10.0 wt %;

(ii) polymerising propylene and butene in a second polymerisation stage in the presence of said catalyst and said first propylene butene copolymer to prepare said multimodal propylene butene random copolymer.

The first polymerisation stage is preferably a slurry polymerisation step. The slurry polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the first polymerisation stages is typically from 60 to 100° C., preferably from 70 to 90° C. An excessively high temperature should be avoided to prevent partial dissolution of the polymer into the diluent and the fouling of the reactor. The pressure is from 1 to 150 bar, preferably from 40 to 80 bar.

The slurry polymerisation may be conducted in any known reactor used for slurry polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654. It is thus preferred to conduct the first polymerisation stage as a slurry polymerisation in a loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerisation stage continuously.

Hydrogen is typically introduced into the first polymerisation stage for controlling the MFR$_2$ of the propylene butene copolymer (A). The amount of hydrogen needed to reach the desired MFR depends on the catalyst used and the polymerisation conditions, as will be appreciated by the skilled worker.

The average residence time in the first polymerisation stage is typically from 20 to 120 minutes, preferably from 30 to 80 minutes. As it is well known in the art the average residence time τ can be calculated from Equation 1 below:

$$\text{Residence Time} \qquad \tau = \frac{V_R}{Q_o} \qquad \text{Equation 1}$$

Where $V_R$ is the volume of the reaction space (in case of a loop reactor, the volume of the reactor, in case of the fluidized bed reactor, the volume of the fluidized bed) and $Q_o$ is the volumetric flow rate of the product stream (including the polymer product and the fluid reaction mixture).

The production rate is suitably controlled with the catalyst feed rate. It is also possible to influence the production rate by suitable selection of the monomer concentration. The desired monomer concentration can then be achieved by suitably adjusting the propylene feed rate.

The second polymerisation stage is preferably a gas phase polymerisation step, i.e. carried out in a gas-phase reactor. Any suitable gas phase reactor known in the art may be used, such as a fluidised bed gas phase reactor.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

A chain transfer agent (e.g. hydrogen) is typically added to the second polymerisation stage.

The split between the first and second polymerisation stages may be in the range 30:70 to 70:30, preferably 40:60 to 60:40, such as 45:55 to 55:45, for example 50:50.

A preferred multistage process is the above-identified slurry-gas phase process, such as developed by Borealis and known as the Borstar® technology. In this respect, reference is made to the EP applications EP 0887379 A1 and EP 0517868 A1.

The polymerisation steps discussed above may be preceded by a prepolymerisation step. The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer. The prepolymerisation step is typically conducted in slurry.

Thus, the prepolymerisation step may be conducted in a loop reactor. The prepolymeriszation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from 0.1 to 1000 grams of monomer per one gram of solid catalyst component is polymerised in the prepolymerisation step. As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the prepolymerisation step when a prepolymerisation step is present. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is understood within the scope of the invention, that the amount of polymer produced in the prepolymerisation typically lies within 1.0-5.0 wt % in respect to the final multimodal propylene butene copolymer.

The multimodal propylene butene copolymer is prepared in the presence of a single site catalyst (which term encompasses a metallocene and a non-metallocene catalyst). These terms have a well-known meaning. Most preferably, the catalyst is a metallocene Any metallocene catalyst capable of catalysing the formation of an olefinic polymer can be used. A suitable metallocene catalyst comprises a metallocene/activator reaction product impregnated in a porous support at maximum internal pore volume. The catalyst complex comprises a ligand which is typically bridged, and a transition metal of group IVa to VIa, and an organoaluminium compound. The catalytic metal compound is typically a metal halide.

Suitable metallocene compounds are those which have a formula $(Cp)_m R_n MR'_o X_p$, where Cp is an unsubstituted or substituted and/or fused homo or heterocyclopentadienyl, R is a group having 1-4 atoms and bridging two Cp rings, M is a transition metal of group 4, 5 or 6 in the Periodic Table of Elements (IUPAC, 1985), R' is $C_1$-$C_2$ hydrocarbyl or hydrocarboxy group and X is a halogen atom, wherein m is 1-3, n is 0 or 1, o is 0-3 and p is 0-3 and sum n+o+p corresponds the oxidation state of the transition metal M. The transition metal M is preferably zirconium, hafnium or titanium, most preferably zirconium.

Examples of suitable metallocene compounds include those of formula (I) or (II):

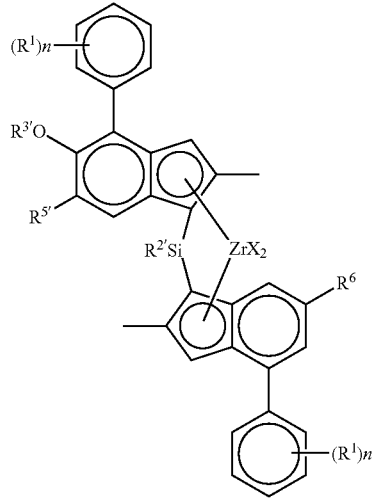

(I)

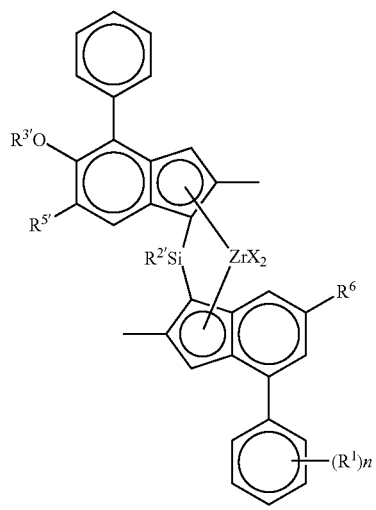

(II)

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group, preferably a tertiary $C_{4-8}$ alkyl group;

$R^{3'}$ is a $C_{1-6}$ alkyl group, or $C_{6-10}$ aryl group optionally substituted by one or more halo groups; and n is independently 0, 1 or 2.

Particular metallocene compounds include:

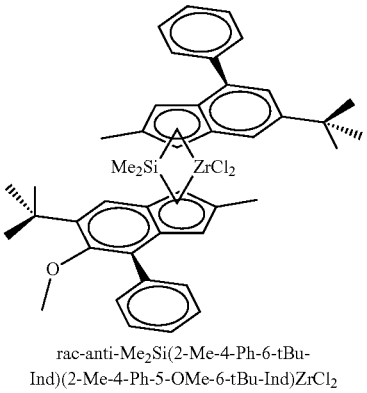

rac-anti-Me$_2$Si(2-Me-4-Ph-6-tBu-Ind)(2-Me-4-Ph-5-OMe-6-tBu-Ind)ZrCl$_2$

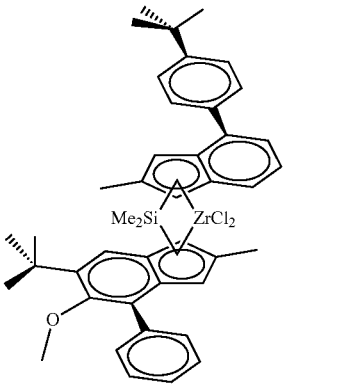

rac-anti-Me$_2$Si(2-Me-4-(p-tBuPh)-Ind)(2-Me-4-Ph-5-OMe-6-tBu-Ind)ZrCl$_2$

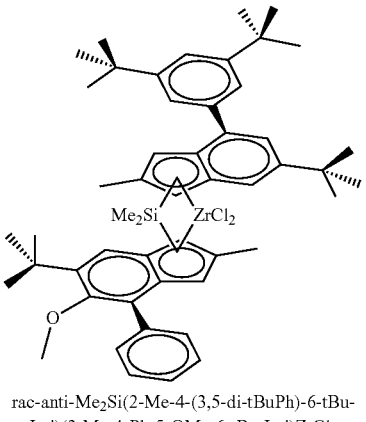

rac-anti-Me$_2$Si(2-Me-4-(3,5-di-tBuPh)-6-tBu-Ind)(2-Me-4-Ph-5-OMe-6-tBu-Ind)ZrCl$_2$

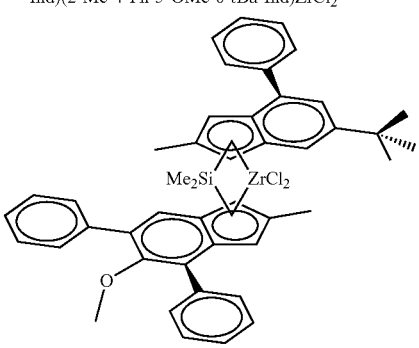

rac-anti-Me$_2$Si(2-Me-4-Ph-6-tBu-Ind)(2-Me-4-Ph-5-OMe-6-tBu-Ind)ZrCl$_2$

-continued
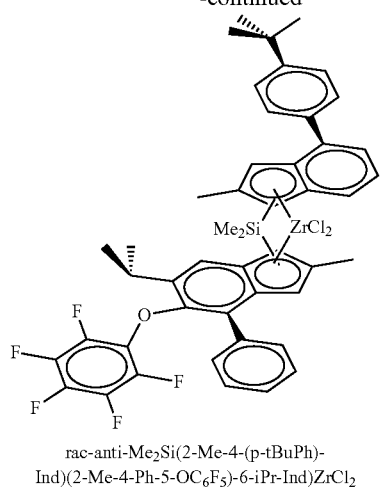
rac-anti-Me₂Si(2-Me-4-(p-tBuPh)-
Ind)(2-Me-4-Ph-5-OC₆F₅)-6-iPr-Ind)ZrCl₂
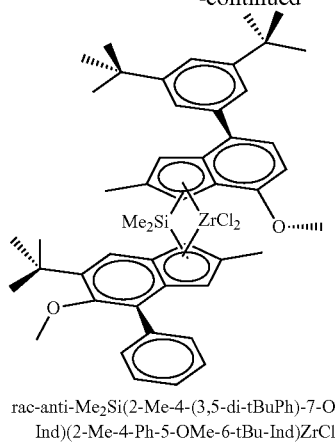
-continued
rac-anti-Me₂Si(2-Me-4-(3,5-di-tBuPh)-7-OMe-
Ind)(2-Me-4-Ph-5-OMe-6-tBu-Ind)ZrCl₂
rac-anti-Me₂Si(2-Me-4-Ph-6-tBu-
Ind)(2-Me-4-Ph-5-OMe-6-tBu-Ind)ZrCl₂
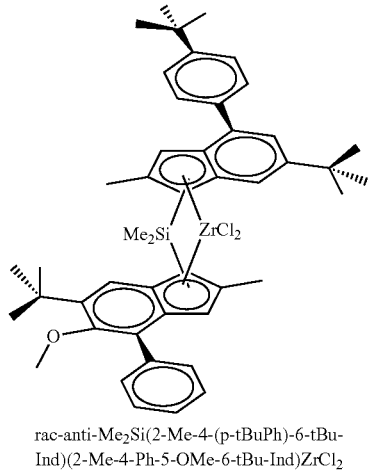
rac-anti-Me₂Si(2-Me-4-(p-tBuPh)-6-tBu-
Ind)(2-Me-4-Ph-5-OMe-6-tBu-Ind)ZrCl₂
rac-anti-Me₂Si(2-Me-4-(3,5-di-
tBuPh)-7-Me-Ind)(2-Me-4-Ph-5-OMe-
6-tBu-Ind)ZrCl₂
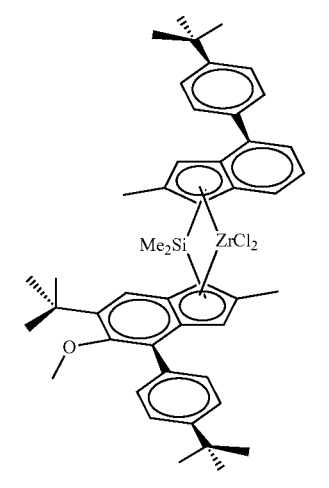
rac-anti-Me₂Si(2-Me-4-(p-tBuPh)-Ind)(2-
Me-4-(4-tBuPh)-5-OMe-6-tBu-Ind)ZrCl₂

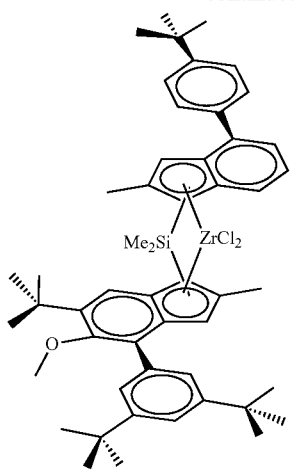

rac-anti-Me₂Si(2-Me-4-(p-tBuPh)-Ind)(2-Me-4-(3,5-tBuPh)-5-OMe-6-tBu-Ind)ZrCl₂

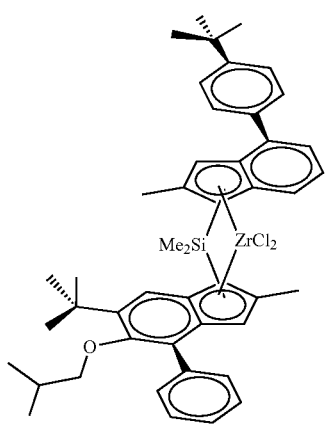

rac-anti-Me₂Si(2-Me-4-(p-tBuPh)-Ind)(2-Me-4-Ph-5-OiBu-6-tBu-Ind)ZrCl₂

Alternatively, the metallocene compound may be selected from:

rac-anti-dimethylsilanediyl[2-methyl-4,7-bis-(3',5'-dimethyl phenyl)-1,5,6,7-tetrahydro-s-indacen-1-yl][2-methyl-4-(3',5'-dimethylphenyl)-5-methoxy-6-tert-butylinden-1-yl] zirconium dichloride

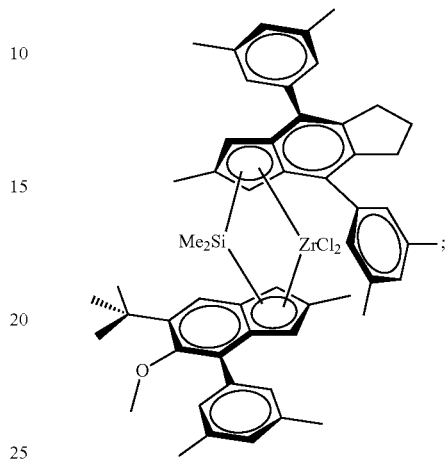

or anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride

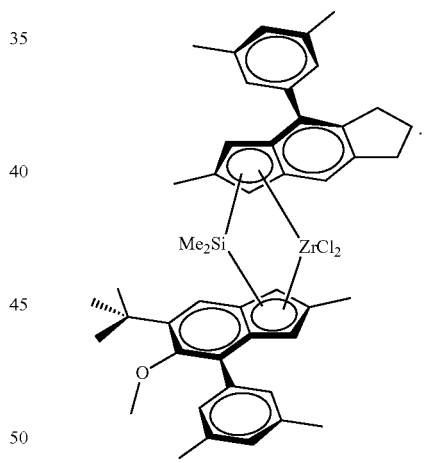

Most preferably rac-anti-Me₂Si(2-Me-4-(p-tBuPh)-Ind)(2-Me-4-Ph-5-OMe-6-tBu-Ind)ZrCl₂ is used.

Such metallocene catalysts are frequently used with catalyst activators or co-catalysts, e.g. alumoxanes such as methylaluminoxane, which are widely described in the literature.

The metallocene catalyst may be supported as is well known in the art. Any suitable support or carrier material can be used, which may be any porous, substantially inert support, such as an inorganic oxide or salt. In practice the support used is preferably a fine-grained inorganic oxide such as an inorganic oxide of an element of Group 2, 13 or 14 in the Periodic Table of Elements (IUPAC, 1985), most preferably silica, alumina or a mixture or derivative of these. Other inorganic oxides which can be used either alone or together with silica, alumina or silica-alumina, are magnesium oxide, titanium dioxide, zirconium oxide, aluminum phosphate etc.

Alternatively, the catalyst may be used in non-supported form or in solid form.

Non-supported catalyst systems, suitable for the present invention can be prepared in solution, for example in an aromatic solvent like toluene, by contacting the metallocene (as a solid or as a solution) with the cocatalyst(s), for example methylaluminoxane and/or a borane or a borate salt previously in an aromatic solvent, or can be prepared by sequentially adding the dissolved catalyst components to the polymerisation medium.

The catalyst system of the invention in solid form, preferably in solid particulate form is generally free from an external carrier, however still being in solid form. By free from an external carrier is meant that the catalyst does not contain an external support, such as an inorganic support, for example, silica or alumina, or an organic polymeric support material.

In order to provide the catalyst system of the invention in solid form but without using an external carrier, it is preferred if a liquid/liquid emulsion system is used. The process involves forming dispersing catalyst components (i) (the complex) and (ii)+optionally (iii) the cocatalysts) in a solvent, and solidifying said dispersed droplets to form solid particles. In particular, the method involves preparing a solution of the catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles. This process enables the manufacture of active catalyst particles with improved morphology, e.g. with a predetermined particle size, spherical shape, compact structure, excellent surface properties and without using any added external porous support material, such as an inorganic oxide, e.g. silica. The catalyst particles can have a smooth surface, they may be compact in nature and catalyst active components can be distributed uniformly thorough the catalyst particles. Full disclosure of the necessary process steps can be found in, for example, WO03/051934.

All or part of the preparation steps can be done in a continuous manner. Reference is made to WO2006/069733 describing principles of such a continuous or semicontinuous preparation methods of the solid catalyst types, prepared via emulsion/solidification method. The formed catalyst preferably has good stability/kinetics in terms of longevity of reaction, high activity and the catalysts enable low ash contents.

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation.

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264. Use of the catalyst prepolymerisation step offers the advantage of minimising leaching of catalyst components and thus local overheating.

The solvent employed in the processes of the invention may be any solvent suitable for use in olefin polymerisation and is typically a mixture of hydrocarbons. Such solvents are well known in the art. Examples of solvents include hexane, cyclohexane, isohexane, n-heptane, C8, C9 isoparaffins and mixtures thereof.

In one embodiment, the polymerisation is carried out in the presence of hydrogen. Hydrogen is typically employed to help control polymer properties, such as polymer molecular weight. In an alternative embodiment, hydrogen is not added in step i. The skilled worker will appreciate, however, that hydrogen may be generated during the polymerisation process. Thus, the hydrogen present in the polymerisation reaction mixture formed in step i. of the process may originate from hydrogen which has been added as a reactant and/or hydrogen produced as a side product during polymerisation.

It will be appreciated that the propylene polymers may contain standard polymer additives. These typically form less than 5.0 wt %, such as less than 2.0 wt % of the polymer material. Additives, such as antioxidants, phosphites, cling additives, pigments, colorants, fillers, anti-static agent, processing aids, clarifiers and the like may thus be added during the polymerisation process. These additives are well known in the industry and their use will be familiar to the artisan. Any additives which are present may be added as an isolated raw material or in a mixture with a carrier polymer, i.e. in so called master batch.

In one embodiment of the invention, the process for preparing the multimodal propylene butene copolymer may further comprise a step of visbreaking. The term "visbreaking" will be well known to the person skilled in the art and relates to a process which results in a controlled breakdown of polymer chains, leading to rheological changes, typically an increase in $MFR_2$. Thus, the multimodal polymers of the invention may be subject to visbreaking to finely tune their rheological profile, as desired. Visbreaking may take place by several methods, as are well known in the art, such as thermal pyrolysis, exposure to ionising radiation or oxidising agents. In the context of the present invention, visbreaking is typically carried out using peroxides.

Applications

Still further, the present invention relates to an article, preferably a film, comprising the multimodal propylene butene random copolymer as described above and to the use of such a multimodal propylene butene random copolymer for the production of an article, preferably a film. The films may be prepared by any known method in the art, such as casting or extrusion.

The films of the invention may be multilayer or monolayer films, but are preferably mono layer films. Moreover, the films of the invention preferably consist of the multimodal propylene butene copolymer of the invention as the sole polymer component. However, it is to be understood herein that the films may comprise further components such as additives which may optionally be added in a mixture with a carrier polymer, i.e. in so called master batch.

Films of the invention which comprise (e.g. consist of) the multimodal propylene butene random copolymer have a seal initiation temperature (SIT) (determined on 50 µm cast film as described in the experimental part) of 130° C. or less, such as 125° C. or less, more preferably 120° C. or less, more preferably of 118° C. or less. Whilst the SIT is ideally as low as possible, typical lower limits might be 100° C., such as 105° C.

Furthermore such films comprising the inventive copolymer shall preferably have a tensile modulus determined according to ISO 527 at 23° C. on cast films with a thickness of 50 µm in machine direction as well as in transverse direction of at least 490 MPa, more preferably at least 500 MPa. Typically, the copolymer has a tensile modulus of less than 900 MPa, such as less than 800 MPa.

The article, preferably film, of the invention may be employed in a number of end applications, in particular food packaging applications. The articles of the current invention are especially suitable for containing food, especially frozen food, such as ice-cream, frozen liquids, sauces, pre-cooked convenience products, and the like.

It will be appreciated that any parameter mentioned above is measured according to the detailed test given below. In any parameter where a narrower and broader embodiment are disclosed, those embodiments are disclosed in connection with the narrower and broader embodiments of other parameters.

The invention will now be described with reference to the following non-limiting examples.

Test Methods:
Melt Flow Rate

The melt flow rate (MFR) is determined according to ISO 1133 and is indicated in g/10 min. The MFR is an indication of the melt viscosity of the polymer. The MFR is determined at 190° C. for PE and 230° C. for PP. The load under which the melt flow rate is determined is usually indicated as a subscript, for instance $MFR_2$ is measured under 2.16 kg load (condition D).

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe head at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09} Standard single-pulse excitation was employed utilising the NOE at short recycle delays {klimke06, pollard04} and the RS-HEPT decoupling scheme. {fillip05, griffin07} A total of 1024 (1 k) transients were acquired per spectra using a 3 s recycle delay.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm {randall89}.

Basic comonomer content method spectral analysis method: Characteristic signals corresponding to the incorporation of 1-butene were observed {randall89} and the comonomer content quantified in the following way.

The amount of 1-butene incorporated in PPBPP isolated sequences was quantified using the integral of the αB2 sites at 43.6 ppm accounting for the number of reporting sites per comonomer:

$$B = I_\alpha/2$$

The amount of 1-butene incorporated in PPBBPP double consecutively sequences was quantified using the integral of the ααB2B2 site at 40.5 ppm accounting for the number of reporting sites per comonomer:

$$BB = 2*I_{\alpha\alpha}$$

When double consecutive incorporation was observed the amount of 1-butene incorporated in PPBPP isolated sequences needed to be compensated due to the overlap of the signals αB2 and αB2B2 at 43.9 ppm:

$$B = (I_\alpha - 2*I_{\alpha\alpha})/2$$

The total 1-butene content was calculated based on the sum of isolated and consecutively incorporated 1-butene:

$$B\text{total} = B + BB$$

The amount of propene was quantified based on the main Sαα methylene sites at 46.7 ppm and compensating for the relative amount of αB2 and αB2B2 methylene unit of propene not accounted for (note B and BB count number of butene monomers per sequence not the number of sequences):

$$P\text{total} = I_{S\alpha\alpha} + B + BB/2$$

The total mole fraction of 1-butene in the polymer was then calculated as:

$$fB = B\text{total}/(B\text{total} + P\text{total})$$

The full integral equation for the mole fraction of 1-butene in the polymer was:

$$fB = (((I_\alpha - 2*I_{\alpha\alpha})/2) + (2*I_{\alpha\alpha}))/(I_{S\alpha\alpha} + ((I_{S\alpha} - 2*I_{\alpha\alpha})/2) + ((2*I_{\alpha\alpha})/2)) + ((I_\alpha - 2*I_{\alpha\alpha})/2) + (2*I_{\alpha\alpha}))$$

This simplifies to:

$$fB=(I_\alpha/2+I_{\alpha\alpha})/(I_{S\alpha\alpha}+I_\alpha+I_{\alpha\alpha})$$

The total incorporation of 1-butene in mole percent was calculated from the mole fraction in the usual manner:

$$B[\text{mol \%}]=100*fB$$

The total incorporation of 1-butene in weight percent was calculated from the mole fraction in the standard manner:

$$B[\text{wt \%}]=100*(fB*56.11)/((fB*56.11)+((1-fB)*42.08))$$

Details of these procedures can be found in Katja Klimke, Matthew Parkinson, Christian Piel, Walter Kaminsky Hans Wolfgang Spiess, Manfred Wilhelm, *Macromol. Chem. Phys.* 2006, 207, 382; Matthew Parkinson, Katja Klimke, Hans Wolfgang Spiess, Manfred Wilhelm, *Macromol. Chem. Phys.* 2007, 208, 2128; Patrice Castignolles, Robert Graf, Matthew Parkinson, Manfred Wilhelm, Marianne Gaborieau, *Polymer* 2009, 50, 2373; M. Pollard, K. Klimke, R. Graf, H. W. Spiess, M. Wilhelm, O. Sperber, C. Piel, W. Kaminsky, *Macromolecules* 2004, 37, 813; Xenia Filip, Carmen Tripon, Claudiu Filip, *J. Magn. Reson.* 2005, 176, 239; John M. Griffin, Carmen Tripon, Ago Samoson, Claudiu Filip, Steven P. Brown, *Mag. Res. in Chem.* 2007, 45(S1), S198; J. Randall *Rev. Macromol. Chem. Phys.* 1989, C29, 201.

Molecular Weight & Molecular Weight Distribution

Molecular weight averages, molecular weight distribution (Mn, Mw, Mz MWD)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i/M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3×Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS}=19\times10^{-3} \text{ mL/g}, \alpha_{PS}=0.655$$

$$K_{PE}=39\times10^{-3} \text{ mL/g}, \alpha_{PE}=0.725$$

$$K_{PP}=19\times10^{-3} \text{ mL/g}, \alpha_{PP}=0.725$$

A third order polynomial fit was used to fit the calibration data.

All samples were prepared in the concentration range of 0.5–1 mg/ml and dissolved at 160° C. for 2.5 hours for PP or 3 hours for PE under continuous gentle shaking.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy (Hm) are determined from the second heating step.

Throughout the patent the term Tc or (Tcr) is understood as Peak temperature of crystallization as determined by DSC at a cooling rate of 10 K/min.

Tensile Test on Films

Tensile tests according to ISO 527 at a temperature of 23° C. were carried out on 10 mm wide strips cut in machine direction (MD) and in transverse direction (TD) from cast films of 50 μm thickness produced on a monolayer cast film line with a melt temperature of 220° C. and a chill roll temperature of 20° C.

C6 FDA

It is measured based on FDA section 177.1520. 1 g of a polymer film of 100 μm thickness is added to 400 ml hexane at 50° C. for 2 hours while stirring with a reflux cooler. After 2 hours the mixture is immediately filtered on a filter paper. The precipitate is collected in an aluminium recipient and the residual hexane is evaporated on a steam bath under $N_2$ flow. The amount of hexane solubles is determined by the formula ((wt. sample+wt. crucible)−(wt crucible))/(wt. sample)×100%.

Dyna Test

The impact strength of films is determined by the Dynatest method according to ISO7725-2 at 23° C. on cast films of 50 μm thickness produced on a monolayer cast film line with a melt temperature of 220° C. and a chill roll temperature of 20° C. with a thickness of 50 μm.

The value Dyna/23° C. [J/mm] represents the relative total penetration energy per mm thickness that a film can absorb before it breaks divided by the film thickness. The higher this value the tougher the material.

Haze

Haze was determined according to ASTM D1003-00 on cast films of 50 μm thickness produced on a monolayer cast film line with a melt temperature of 220° C. and a chill roll temperature of 20° C.

Sterilisation

Steam sterilisation was performed in a Systec D series machine (Systec Inc., USA). The samples were heated up at a heating rate of 5° C./min starting from 23° C. After having been kept for 30 min at 121° C., they were removed immediately from the steam steriliser and stored at room temperature until being processed further.

Xylene Soluble Fraction (XCS)

The amount of the polymersoluble in xylene is determined at 25° C. according to ISO 16152; 5th edition; 2005-07-01.

Flexural Modulus

The flexural modulus was determined in 3-point-bending at 23° C. according to ISO 178 on 80×10×4 mm$^3$ test bars injection moulded in line with EN ISO 1873-2.

Seal Initial Temperature (SIT)

The method determines the sealing temperature range (sealing range) of polypropylene films, in particular blown films or cast films according to ASTM F1921-12. Seal pressure, cool time and peel speed are modified as stated below. The sealing temperature range is the temperature range, in which the films can be sealed according to conditions given below. The lower limit (heat sealing initiation temperature (SIT)) is the sealing temperature at which a sealing strength of >5 N is achieved. The upper limit (sealing end temperature (SET)) is reached, when the films stick to the sealing device.

The sealing range is determined on a J&B Universal Sealing Machine Type 3000 with a blown film of 50 μm thickness with the following further parameters:

Specimen width: 25.4 mm
Seal Pressure: 0.1 N/mm$^2$
Seal Time: 0.1 sec
Cool time: 99 sec
Peel Speed: 10 mm/sec
Start temperature: 50° C.
End temperature: 150° C.
Increments: 10° C.

specimen is sealed A to A at each sealbar temperature and seal strength (force) is determined at each step.

The temperature is determined at which the seal strength reaches 5 N.

EXPERIMENTAL

Catalyst:

The catalyst used in the polymerisation processes for the C3C4 random copolymer composition of the inventive example (IE1) was prepared as follows: The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650.

The catalyst was prepared using metallocene MC1 and a catalyst system of MAO and trityl tetrakis(pentafluorophenyl)borate according to Catalyst 3 of WO 2015/11135 with the proviso that the surfactant is 2,3,3,3-tetrafluoro-2-(1,1,2,2,3,3,3-heptafluoropropoxy)-1-propanol.

Production of the Multimodal Propylene Butene Random Copolymers of the Invention (IE1 and IE2)

The inventive examples (IE1 & IE2) were prepared in a two stage polymerisation process, under the conditions outlined in Table 1, using a catalyst as defined above. MFR of the final polymer was adjusted using visbreaking to the values shown in the Table. Properties of the various fractions and final multimodal copolymers are also presented in Table 1. Film properties are shown in Table 3.

TABLE 1

Production Data for Inventive multimodal propylene butene random copolymers

|  | Unit | IE1 | IE2 |
|---|---|---|---|
| Prepolymeriser |  |  |  |
| Temperature | ° C. | 20 | 20 |
| Residence time | min | 20 | 20 |
| Loop reactor |  |  |  |
| Temperature | ° C. | 75 | 75 |
| Feed H2/C3 ratio | mol/kmol | 0.1 | 0.1 |
| Feed C4/C3 ratio | mol/kmol | 29.9 | 30.2 |
| Split | wt % | 39 | 38 |
| MFR$_2$ | g/10 min | 2.0 | 2.0 |
| C4 content | wt % | 5.5 | 5.5 |
| First GPR |  |  |  |
| Temperature | ° C. | 80 | 80 |
| H2/C3 ratio | mol/kmol | 1.1 | 1.1 |
| C4/C3 ratio | mol/kmol | 60 | 107 |
| Split | wt % | 61 | 62 |
| MFR$_2$ | g/10 min | 2.0 | 1.9 |
| C4 content after GPR | wt % | 7.0 | 10.3 |
| Pellet Density |  |  |  |
| C4 total | wt % | 6.6 | 9.1 |
| MFR$_2$ | g/10 min | 9 | 10 |
| Tm | ° C. | 138 | 138 |
| XCS | wt % | 0.86 | 4.3 |
| C6 FDA | wt % | 0.63 | 0.75 |
| Flexural modulus | MPa | 1015 | 838 |

The pelletization was done on a ZSK 32 twin screw extruder. The desired amount of PP powder, additives (1000 ppm of B215 supplied by BASF, 500 ppm of calcium stearate from Baerlocher) and proper amount of Triganox 101 (AkzoNobel) were mixed and extruder at 220° C., with a throughput of 100 kg/h. The amount of Triganox 101 was adjusted by man skilled in the art to reach the target final MFR. The properties measured on the pellets are reported in Table 1.

Production of Comparative Copolymers (CE1 & CE2)

CE1 is a single site catalyzed unimodal propylene butene random copolymer prepared using the catalyst described above, C4 content 6.1 wt % and MFR$_2$ after visbreaking 12 g/10 min. CE2 is a Ziegler-Natta catalyzed propylene ethylene random copolymer, MFR$_2$ 8 g/10 min.

Preparation of the Ziegler-Natta Catalyst for CE2:

Used Chemicals:

20% solution in toluene of butyl ethyl magnesium (Mg(Bu)(Et), BEM), provided by Chemtura
2-ethylhexanol, provided by Amphochem
3-Butoxy-2-propanol—(DOWANOL™ PnB), provided by Dow
bis(2-ethylhexyl)citraconate, provided by SynphaBase
TiCl4, provided by Millenium Chemicals
Toluene, provided by Aspokem
Viscoplex® 1-254, provided by Evonik
Heptane, provided by Chevron Preparation of a Mg Alkoxy Compound:

Mg alkoxide solution was prepared by adding, with stirring (70 rpm), into 11 kg of a 20 wt % solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component:

20.3 kg of TiCl4 and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethylaluminium (TEAL) as co-catalyst and dicyclopentyl dimethoxy silane (D-Donor) as donor for preparing the polymer CE2

The pelletization was done on a ZSK 32 twin screw extruder. The desired amount of PP powder, additives (1000 ppm of B215 supplied by BASF, 500 ppm of calcium stearate from Baerlocher) and proper amount of Triganox 101 (AkzoNobel) were mixed and extruder at 220° C., with a throughput of 100 kg/h. The amount of Triganox 101 was adjusted by man skilled in the art to reach the target final MFR. The properties measured on the pellets are reported in Table 2. Film properties are shown in Table 3.

TABLE 2

Production Data for Comparative copolymers

| | Unit | CE1 | CE2 |
|---|---|---|---|
| Prepolymeriser | | | |
| Temperature | ° C. | 20 | 29 |
| Residence time | Min | 20 | 20 |
| Loop | | | |
| Temperature | ° C. | 70 | 70 |
| Pressure | Bar | 55 | 55 |
| Feed H2/C3 | mol/kmol | 0.1 | 0.6 |
| Feed C2/C3 | mol/kmol | 0 | 7.5 |
| Feed C4/C3 | mol/kmol | 33 | 0 |
| MFR | g/10 min | 1.7 | 1.8 |
| C2 | wt % | 0 | 3.5 |
| C4 | wt % | 6.1 | 0 |
| split | wt % | 100 | 41 |
| First GPR | | | |
| Temperature | ° C. | Not in use | 80 |
| H2/C3 | mol/kmol | | 58 |
| C2/C3 | mol/kmol | | 27 |
| MFR | g/10 min | | 1.7 |
| C2 | wt % | | 4.1 |
| Pellets | | | |
| C2 total | wt % | 0 | 4.1 |
| C4 total | wt % | 6.1 | 0 |
| MFR | g/10 min | 12 | 8 |
| Tm | ° C. | 139 | 140 |
| C6 FDA | wt % | 1.16 | 2.5 |
| XCS | wt % | 1.55 | 9.8 |
| Flexural modulus | MPa | 1089 | 850 |

Film Production

Films were produced on a Collin 30 lab scale cast film line, with a melt temperature of 220° C. and chill roll temperature of 20° C. the throughput was 8 kg/h. The film thickness is 50 µm.

TABLE 3

Film properties for Inventive and Comparative multimodal propylene copolymers

| | | IE1 | IE2 | CE1 | CE2 |
|---|---|---|---|---|---|
| TM/MD | MPa | 616 | 514 | 599 | 488 |
| TM/TD | MPa | 594 | 508 | 573 | 501 |
| Dyna/23° C. | J/mm | 16.6 | 17.8 | 17.5 | 37.5 |
| Haze/b.s. | % | 0.34 | 0.55 | 0.38 | 0.17 |
| Haze/a.s. | % | 0.26 | 1.39 | 0.61 | 15 |
| SIT | ° C. | 112 | 107 | 113 | 114 |

The invention claimed is:

1. A multimodal propylene butene random copolymer having a melt flow rate (MFR$_2$) of 1.0 to 20.0 g/10 min when determined under 2.16 kg load at 230° C. and a butene content of 5.0 to 20.0 wt %, wherein said copolymer is prepared using a single site catalyst and wherein said copolymer comprises:
  (i) 30 to 70 wt % of a propylene butene copolymer (A) having an MFR$_2$ of 0.5 to 20.0 g/10 min when determined under 2.16 kg load at 230° C. and a butene content of 2.0 to 10.0 wt %; and
  (ii) 70 to 30 wt % of a propylene butene copolymer (B) having an MFR$_2$ of 0.5 to 20.0 g/10 min when determined under 2.16 kg load at 230° C. and a butene content of 4.0 to 20.0 wt %;
  wherein copolymers (A) and (B) are different, wherein said multimodal copolymer is substantially free of ethylene.

2. The multimodal propylene butene random copolymer as claimed in claim 1, wherein said single site catalyst is a metallocene catalyst.

3. The multimodal propylene butene random copolymer as claimed in claim 1, wherein the butene content of said multimodal copolymer is in the range 6.0 to 16.0 wt %.

4. The multimodal propylene butene random copolymer as claimed in claim 1, wherein a xylene soluble fraction is less than 10.0 wt % when determined at 25° C.

5. The multimodal propylene butene random copolymer as claimed in claim 1, wherein said multimodal copolymer has a flexural modulus of at least 750 MPa.

6. The multimodal propylene butene random copolymer as claimed in claim 1, wherein said multimodal copolymer has a molecular weight distribution (Mw/Mn) of less than 4.5.

7. The multimodal propylene butene random copolymer as claimed in claim 1, wherein the MFR$_2$ of the multimodal copolymer is in the range 4.0 to 12.0 g/10 min when determined under 2.16 kg load at 230° C.

8. An article comprising the multimodal propylene butene copolymer as defined in claim 1.

9. The article as claimed in claim 8, wherein said article is a film.

10. The article of claim 9, wherein the film is a monolayer film.

11. A process for the preparation of the multimodal propylene butene random copolymer as defined in claim 1, said process comprising:
  (i) polymerising propylene and butene in a first polymerisation stage in the presence of a single site catalyst to prepare a first propylene butene copolymer having a $MFR_2$ from 0.5 to 20.0 g/10 min when determined under 2.16 kg load at 230° C. and a butene content of 2.0 to 10.0 wt %;
(ii) polymerising propylene and butene in a second polymerisation stage in the presence of said catalyst and said first propylene butene copolymer to prepare said multimodal propylene butene copolymer.

12. The process as claimed in claim 11, wherein the first polymerisation stage is carried out in a loop reactor and the second polymerisation stage is carried out in a gas phase reactor.

* * * * *